(12) United States Patent
Li et al.

(10) Patent No.: US 9,179,148 B2
(45) Date of Patent: Nov. 3, 2015

(54) SIMPLIFIED BILATERAL INTRA SMOOTHING FILTER

(75) Inventors: Guichun Li, Santa Clara, CA (US); Lingzhi Liu, San Jose, CA (US); Changcai Lai, Shenzhen (CN); Nam Ling, San Jose, CA (US); Jianhua Zheng, Shenzhen (CN); Chen-Xiong Zhang, Plano, TX (US)

(73) Assignees: Futurewei Technologies, Inc., Plano, TX (US); Santa Clara University, Santa Clara, CA (US)

( * ) Notice: Subject to any disclaimer, the term of this patent is extended or adjusted under 35 U.S.C. 154(b) by 657 days.

(21) Appl. No.: 13/495,899

(22) Filed: Jun. 13, 2012

(65) Prior Publication Data

US 2013/0003832 A1     Jan. 3, 2013

Related U.S. Application Data

(60) Provisional application No. 61/503,415, filed on Jun. 30, 2011.

(51) Int. Cl.
| | |
|---|---|
| *H04N 7/24* | (2011.01) |
| *H04N 19/105* | (2014.01) |
| *H04N 19/176* | (2014.01) |
| *H04N 19/593* | (2014.01) |
| *H04N 19/117* | (2014.01) |
| *H04N 19/136* | (2014.01) |
| *H04N 19/182* | (2014.01) |

(Continued)

(52) U.S. Cl.
CPC ............ *H04N 19/105* (2014.11); *H04N 19/117* (2014.11); *H04N 19/136* (2014.11); *H04N 19/176* (2014.11); *H04N 19/182* (2014.11); *H04N 19/593* (2014.11); *H04N 19/80* (2014.11); *H04N 19/147* (2014.11); *H04N 19/159* (2014.11)

(58) Field of Classification Search
CPC .... H04N 19/50; H04N 19/159; H04N 19/593
USPC ......................................... 375/240.12
See application file for complete search history.

(56) References Cited

U.S. PATENT DOCUMENTS

| | | | |
|---|---|---|---|
| 2008/0089417 A1* | 4/2008 | Bao et al. | 375/240.16 |
| 2011/0038415 A1* | 2/2011 | Min et al. | 375/240.12 |
| 2012/0200669 A1* | 8/2012 | Lai et al. | 348/43 |

FOREIGN PATENT DOCUMENTS

| | | |
|---|---|---|
| CN | 101212561 A | 7/2008 |
| CN | 101706954 A | 5/2010 |
| CN | 101909141 A | 12/2010 |

OTHER PUBLICATIONS

Foreign Communication From A Related Counterpart Application, PCT Application PCT/CN2012/078022, International Search Report dated Oct. 18, 2012, 3 pages.

(Continued)

*Primary Examiner* — Mehrdad Dastouri
*Assistant Examiner* — Rowina Cattungal
(74) *Attorney, Agent, or Firm* — Conley Rose, P.C.; Grant Rodolph; William H. Dietrich (57) ABSTRACT

A method comprising receiving a plurality of reference pixels, computing a plurality of filter coefficients based on differences between a reference pixel and neighboring reference pixels in the plurality of reference pixels, and combining the filter coefficients with the reference pixel and the neighboring reference pixels to generate a filtered value, wherein the filtered value is used for intra prediction.

11 Claims, 6 Drawing Sheets

(51) Int. Cl.
*H04N 19/80* (2014.01)
*H04N 19/159* (2014.01)
*H04N 19/147* (2014.01)

(56) References Cited

OTHER PUBLICATIONS

Foreign Communication From A Related Counterpart Application, PCT Application PCT/CN2012/078022, Written Opinion dated Oct. 18, 2012, 8 pages.
"Series H: Audiovisual and Multimedia Systems, Infrastructure of Audiovisual Services—Coding of Moving Video, Advanced Video Coding for Generic Audiovisual Services," ITUT H.264, Nov. 2007, 564 pages.
Tomasi, C., et al., "Bilateral Filtering for Gray and Color Images," Proceedings of the 16th International Conference on Computer Vision, Bombay, India, Jan. 4-7, 1998, pp. 839-846.
Aurich, V., et al. "Non-Linear Gaussian Filters Performing Edge Preserving Diffusion," Proceedings of the German Association for Pattern Recognition Symposium, Bielefedd, Germany, Sep. 13-15, 1995, pp. 538-545.
Zheng, Y., et al., "CE 13: Mode Dependent Hybrid Intra Smoothing," Joint Collaborative Team on Video Coding (JCT-VC) of ITU-T SG 16 WP3 and ISO/IEC JTC1/SC29/WG11, JCTVC-D282, 4th Meeting: Daegu, Korea, Jan. 20-28, 2011, 5 pages.
Sugimoto, K., et al., "CE6.f: Verification Report on LUT-Based Adaptive Filtering on Intra Prediction Samples," Joint Collaborative Team on Video Coding (JCT-VC) of ITU-T SG 16 WP3 and ISO/IEC JTC1/SC29/WG11, JCTVC-E069, 5th Meeting: Geneva, Switzerland, Mar. 16-23, 2011, 6 pages.
Zhao, J., et al., "On Intra Coding and MDIS," Joint Collaborative Team on Video Coding (JCT-VC) of ITU-T SG 16 WP3 and ISO/IEC JTC1/SC29/WG11, JCTVC-E437, 5th Meeting: Geneva, Switzerland, Mar. 16-23, 2011, 4 pages.
Li, G., et al., "Simplified Bilateral intra Smoothing Filter," Joint Collaborative Team on Video Coding (JCT-VC) of ITU-T SG 16 WP3 and ISO/IEC JTC1/SC29/WG11, JCTVC-F528, 6th Meeting: Torino, Italy, Jul. 14-22, 2011, 4 pages.

* cited by examiner

SIMPLIFIED BILATERAL INTRA SMOOTHING FILTER

CROSS-REFERENCE TO RELATED APPLICATIONS

The present application claims priority to U.S. Provisional Patent Application No. 61/503,415 filed Jun. 30, 2011 by Guichun Li et al and entitled "Simplified Bilateral Intra Smoothing Filter", which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

The amount of video data needed to depict even a relatively short film can be substantial, which may result in difficulties when the data is to be streamed or otherwise communicated across a communications network with limited bandwidth capacity. Thus, video data is generally compressed prior to being communicated across modern day telecommunications networks. Video compression devices often use software and/or hardware at the source to code the video data prior to transmission, thereby decreasing the quantity of data needed to represent digital video images. The compressed data is then received at the destination by a video decompression device that decodes the video data. With limited network resources and ever increasing demands of higher video quality, improved compression and decompression techniques that improve image quality without increasing bit-rates are desirable.

SUMMARY

In one embodiment, the disclosure includes a method comprising receiving a plurality of reference pixels, computing a plurality of filter coefficients based on differences between a reference pixel and neighboring reference pixels in the plurality of reference pixels, and combining the filter coefficients with the reference pixel and the neighboring reference pixels to generate a filtered value, wherein the filtered value is used for intra prediction.

In another embodiment, the disclosure includes an apparatus comprising a processor configured to receive a plurality of reference pixels, compute a plurality of filter coefficients based on differences between a reference pixel and neighboring reference pixels in the plurality of reference pixels; and combine the filter coefficients with the reference pixel and the neighboring reference pixels to generate a filtered value, wherein the filtered value is used for intra prediction.

In yet another embodiment, the disclosure includes an apparatus comprising at least one processor configured to receive a plurality of reference pixels, wherein the reference pixels comprise a current pixel and a plurality of neighboring pixels; compute a plurality of bilateral filter coefficients based on a range filter comprising a plurality of range filter coefficients, wherein at least one range filter coefficient is based on a difference between the current pixel and at least one neighboring pixel, and a domain filter comprising a plurality of domain filter coefficients, wherein at least one domain filter coefficient is based on a distance between the current pixel and at least one neighboring pixel, and combine the bilateral filter coefficients with the current pixel and the neighboring pixels to generate a filtered value, wherein the filtered value is used for intra prediction.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Typically, video media involves displaying a sequence of still images or frames in relatively quick succession, thereby causing a viewer to perceive motion. Each frame may comprise a plurality of picture elements or pixels, each of which may represent a single reference point in the frame. During digital processing, each pixel may be assigned an integer value (e.g., 0, 1, . . . or 255) that represents an image quality or characteristic, such as luminance or chrominance, at the corresponding reference point. Groups of pixels (macroblocks) within a single frame may be substantially correlated with other macroblocks within the same frame such that pixel values across some macroblocks may vary only slightly and/or exhibit repetitious textures. Modern methods of video-compression exploit these spatial correlations using various techniques which may be known collectively as intra-frame prediction (or in short as intra prediction). Intra-frame prediction may reduce spatial redundancies between adjacent and/or neighboring macroblocks (also referred to herein as blocks) in the same frame, thereby compressing the video data without greatly reducing image quality. Different forms of intra-frame prediction have been described by various conventional video/image coding standards, such as the International Telecommunications Union (ITU) Telecommunications Standardization Sector (ITU-T) H.264 (hereinafter, H.264), which is incorporated herein by reference as if reproduced in its entirety.

In practice, intra-frame predication may be implemented by video encoders/decoders (codecs) to interpolate a prediction block (or predicted block) from one or more previously coded/decoded neighboring blocks, thereby creating an approximation of the current block. Hence, the encoder and decoder may interpolate the prediction block independently, thereby enabling a substantial portion of a frame and/or image to be reconstructed from the communication of a relatively few number of reference blocks, e.g., blocks positioned in (and extending from) the upper-left hand corner of the frame. However, intra-frame prediction alone may not reproduce an image of sufficient quality for modern video, and consequently an error correction message, e.g., a residual message, may be communicated between the encoder and decoder to correct differences between the prediction block and the current block. For instance, an encoder may subtract the prediction block from the current block to produce a residual block, which then may be transformed, quantized, and scanned before being coded into the coded data stream. Upon reception of the coded data stream, a decoder may add the reconstructed residual block to the independently generated prediction block to recreate the current block. Although the recreated current block may be an imperfect version of the original current block, e.g., due to the lossy nature of intra-frame coding compression, their differences may be hardly perceptible to the human eye. Thus, substantial bit savings may be derived without significantly degrading the quality of the reconstructed image.

The residual block may comprise few differences between the prediction block and the current block, and therefore many of the residual block's discrete values, e.g., pixel data, may comprise zero and/or near-zero coefficients, e.g., in areas where the prediction block is identical and/or near-identical to the current block. Furthermore, transformation, quantization, and/or scanning of the residual block may remove many of the zero and/or near-zero coefficients from the data stream, thereby resulting in further compression of the video data. Consequently, coding efficiencies may result from more accurate predictions of the original image. To harness these coding efficiencies, conventional video/image coding standards may improve prediction accuracy by using a plurality of prediction modes during intra-frame prediction, e.g., each of which may generate a unique texture. For example, the High Efficiency Video Coding (HEVC) video compression standard (also known as H.265) may employ various prediction modes in a Unified Intra Prediction (UIP) scheme.

Figure 1:
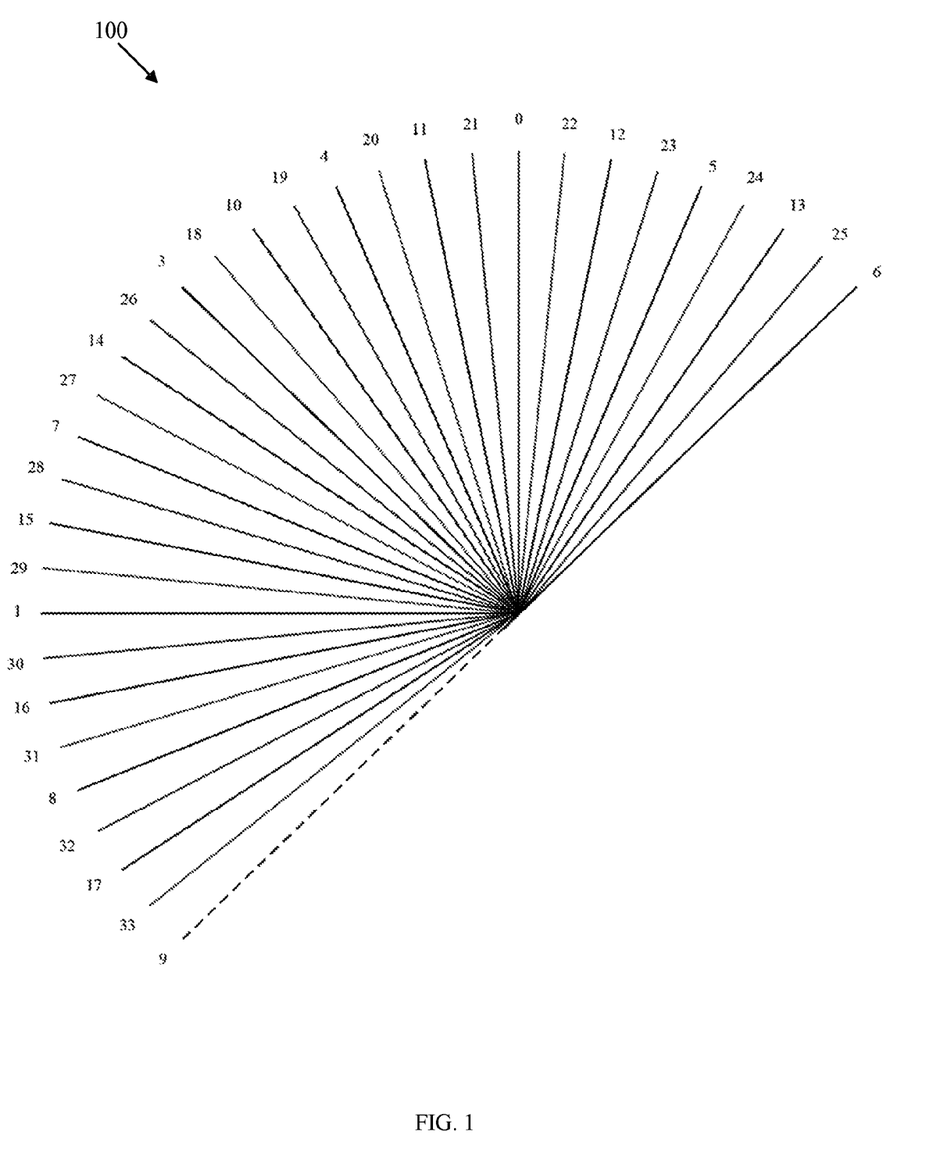
FIG. 1 is a schematic diagram of a plurality of intra prediction modes.

FIG. 1 illustrates a schematic diagram of a plurality of intra prediction modes 100 used in the HEVC UIP scheme. For luminance blocks, the intra prediction modes 100 may comprise up to 34 intra prediction modes, which may include 33 directional modes and one non-directional mode, such as a Direct Current (DC) prediction mode. In use, an encoder may select a prediction mode that generates the most accurate prediction for each current block. For example, the sum of absolute errors (SAE) may be calculated for each mode in the intra prediction modes 100, and the one with the least SAE may be selected. In general, more accurate intra prediction may be resulted from a larger number of intra prediction modes. For example, recent research has shown that conventions using 34 intra-frame prediction modes, such as the intra prediction modes 100, may more accurately predict complex textures than conventions using fewer prediction modes, such as H.264, which uses only 9 intra prediction modes. While FIG. 1 shows 34 intra prediction modes, depending on block-size and/or the intra prediction scheme, any other number of prediction modes may be used.

As noted above, during intra prediction, pixels surrounding a current block may be used as reference pixels (or prediction samples) to generate a prediction block. The quality of intra prediction may be affected by factors such as block size and prediction mode. For example, as the size of the prediction block increases, the prediction accuracy of pixels in the prediction block that are farther away from the reference pixels may be degraded. This degradation of prediction accuracy may result in more residual data, which in turn may increase the data to be encoded, stored, and/or transmitted. To overcome the degradation of accuracy in intra prediction, a smoothing filter may be applied to reference pixels. In some cases, however, it is possible that better results may be achieved without using a smoothing filter. Therefore, in practice, the video encoder may compare the accuracy of intra prediction based on both filtered and unfiltered reference pixels, and then determine whether to apply a smoothing filter to reference pixels. This method may be referred to as adaptive intra smoothing (AIS).

Alternatively, to reduce complexity of the encoder caused by comparison of filtered and unfiltered reference pixels, another technique may be used to determine when an intra smoothing filter should be applied to reference pixels, which may be referred to as mode-dependent intra smoothing (MDIS). MDIS may determine whether to use a smoothing filter based on a size of the current block and a prediction mode (or direction). There exists a plurality of MDIS methods. For example, one MDIS method may explicitly signal whether the reference pixels are filtered. The encoder may make the smoothing decision by testing the Rate-Distortion (RD) cost for all potential intra prediction modes. In an alternative MDIS method, the RD cost of filtered or unfiltered reference pixels may only be tested for the best intra prediction mode, leading to a relatively faster MDIS process.

Current designs of HEVC Test Model (HM) may employ MDIS as an intra smoothing scheme. In current MDIS filters, the value of a current reference pixel may be computed to a weighted average of pixel values in the neighborhood of the current pixel. Typically, the averaging weights may decrease with distance from the neighborhood center. For example, HM 3.1 may use a 3-tap filter which involves two neighboring pixels centered around the current pixel. In this case, the distance between the current reference pixel and its neighboring pixels may simply equal one, and filter coefficients of [1 2 1] may be used. Although the spatial filtering scheme used in MDIS may help improve accuracy of intra prediction, it may have certain issues and/or limitations. For example, an underlying assumption of this intra smoothing filter is that images typically vary slowly over space, and close (or nearby) pixels may likely have similar values, therefore it may be appropriate to average pixel values. Noise values that corrupt these nearby pixels may be less correlated than the color values, so noise may be averaged away while actual color information may be preserved. However, the assumption of slow spatial variations may fail at edges or lines in a video frame, which may signal sharp changes in color values of nearby pixels. The edges or lines may be consequently blurred by intra smoothing filtering, leading to loss of information. In order to preserve the edges or lines, while still averaging pixels in smooth regions, a bilateral filter may be implemented, which filters reference pixels not only based on its spatial closeness to neighboring pixels, but also based on its photometric similarity to neighboring pixels.

The idea underlying bilateral filtering is to do in the range of an image what traditional filters (e.g., MDIS filter) do in its domain. For example, two pixels may be close to one another, that is, occupy nearby spatial location, or they may be similar to one another, that is, have nearby color (or photometric) values. Herein, closeness may refer to vicinity in the domain, and similarity may refer to vicinity in the range. MDIS filtering may be a type of domain filtering (or distance filtering), which enforces closeness by weighing pixel values with coefficients that fall off with distance. Similarly, range filtering may average pixel values with weights that decay with difference or dissimilarity. Thus, range filtering may preserve edge or line features in an image. Range filtering and domain filtering may form a combination, which may be referred to as bilateral filtering. Although bilateral filtering may address certain limitations of MDIS filtering, in practice, it may be difficult to implement in video codecs. The computational complexity of the original designs of bilateral filters may be too high to be incorporated into efficient codecs. Complex algorithms such as nonlinear Gaussian filtering may be needed, according to an article entitled "Bilateral Filtering for Gray and Color Images," by C. Tomasi and R. Manduchi in *Proceedings of the 16th IEEE International Conference on Computer Vision*, Bombay, India, Jan. 4-7, 1998, pp. 839-846, and an article entitled "Non-Linear Gaussian Filters Performing Edge Preserving Diffusion," by V. Aurich and J. Weule in *Proceedings of the German Association for Pattern Recognition (DAGM) Symposium*, Bielefeld, Germany, Sep. 13-15, 1995, pp. 538-545, each of which is hereby incorporated by reference. Due to the high complexity of algorithms used in the original designs of bilateral filters, complex operations such as floating points computations may be needed, which may prevent the original bilateral filter from becoming a viable filtering scheme for HEVC coding.

Disclosed herein is a system and method for simplified bilateral intra smoothing filtering. A disclosed bilateral filter may comprise a range filter and a domain filter. The two filters may be applied sequentially to a current reference pixel, or may be applied as a unified (or combined) filter. The range filter may determine its coefficients by calculating a luminance difference between the current reference pixel and its neighboring reference pixels, thus it may adaptively adjust range filter coefficients based on the similarity of nearby pixels. On the other hand, the domain filter may be the same or similar to current intra smoothing filters used in MDIS, and may average luminance values based on the distance (or closeness) of the current reference pixel to its neighboring reference pixels. The range filter coefficients and domain filter coefficients may be combined to compute coefficients of the bilateral filter, which may be a linear combination of the current reference pixel value and its neighboring reference pixel values. In the computation of a filtered value for the current reference pixel, an integer division may be simplified to integer shifting, addition and/or subtraction operations, which may have lower complexity. Thus, in the present disclosure, computational complexity of algorithms may be lower compared to original designs of bilateral filters. The disclosed bilateral filter may preserve edges and/or lines, while averaging smooth regions of a video frame or image. Thus, the disclosed techniques may efficiently perform intra smoothing, while improving subject quality of decoded videos.

Figure 2:
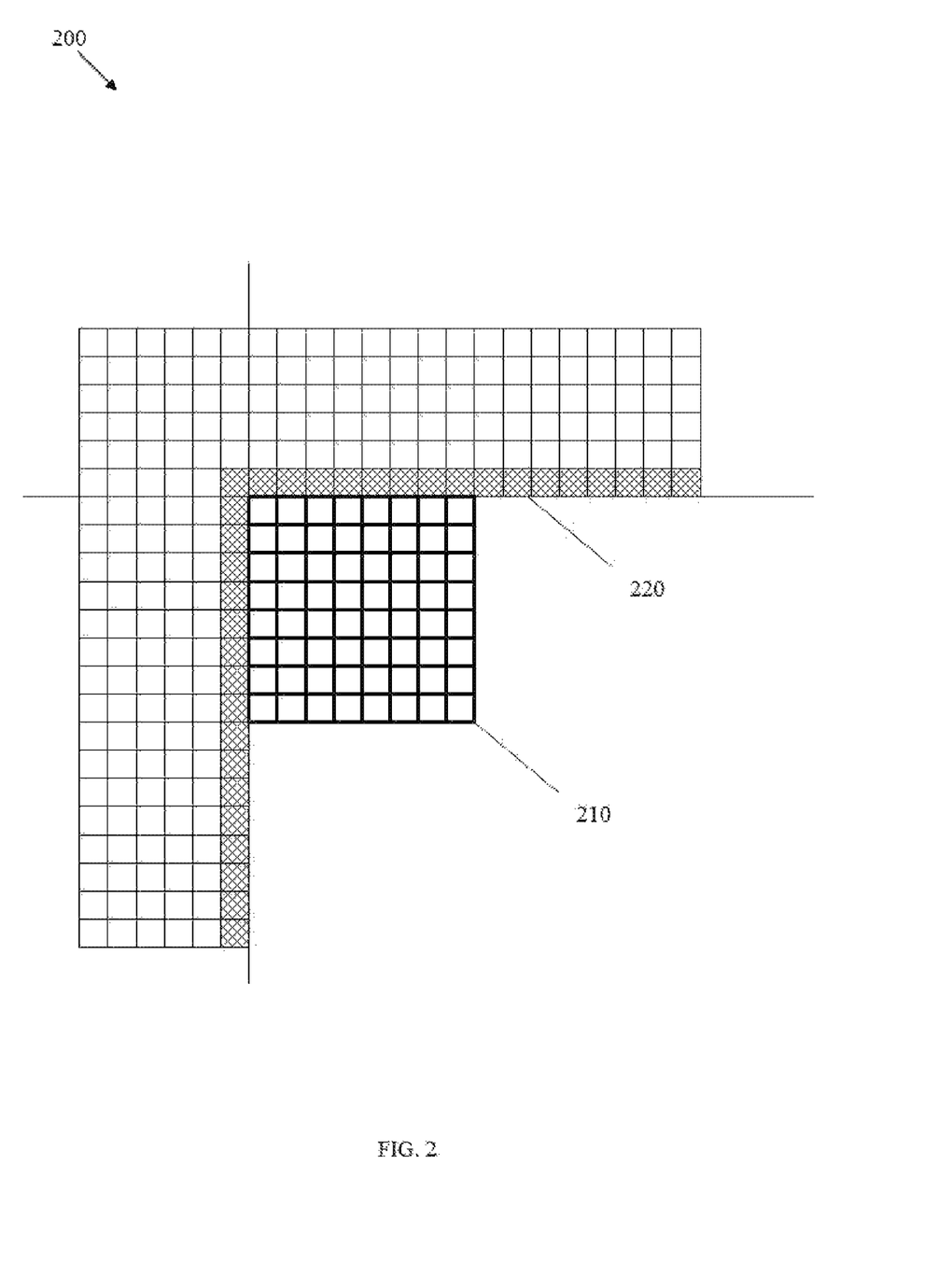
FIG. 2 is a schematic diagram of an embodiment of an intra prediction scheme.

FIG. 2 is a schematic diagram of an embodiment of an intra prediction scheme 200. To predict a current block with size of N×N, where N is an integer greater than one, the intra prediction scheme 200 may generate a N×N prediction block 210. Suppose, for the purpose of illustration, that the prediction block 210 has a size of 8×8 as shown in FIG. 2. Since pixels surrounding the prediction block 210 may have already been generated prior to the prediction block 210, they may be used to generate the prediction block 210. Particularly, a number of pixels located in a column left to (and adjacent) the prediction block 210, and in a row above (and adjacent) the prediction block 210 may be used as reference pixels 220, which are marked as cross-hatched pixels in FIG. 2. In use, for a N×N prediction block, the number of reference pixels 220 may be up to 4N+1. For example, for the 8×8 prediction block 210, there may be up to 33 reference pixels as shown in FIG. 2. In an embodiment, to improve the quality of intra prediction, the reference pixels 220 may be intra-smoothed using a disclosed bilateral filter before generating the prediction block 210 following any of a number of intra prediction modes (e.g., intra prediction modes 100 in FIG. 1). Depending on the intra prediction mode and size of the prediction block 210, intra smoothing may also be skipped. While FIG. 2 shows a square prediction block 210, it should be understood that a disclosed bilateral filter may also be used to generate non-square prediction blocks, such as non-square blocks that may be used in a short distance intra prediction (SDIP) scheme.

Figure 3:
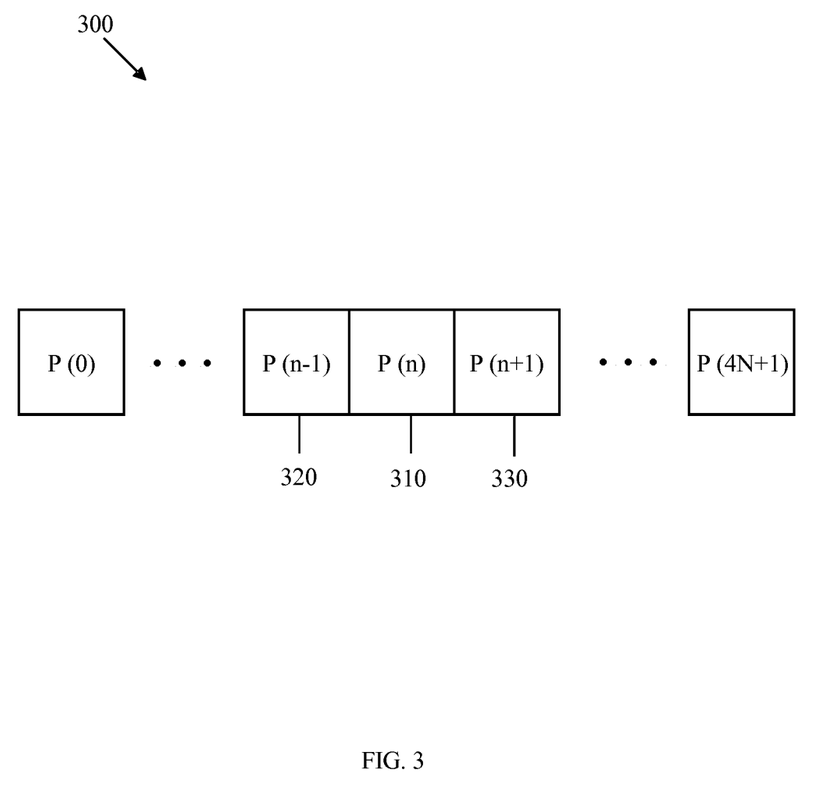
FIG. 3 is a schematic diagram of an embodiment of a sequence of reference pixels.

In an embodiment, to facilitate bilateral filtering, reference pixels may be stored and/or processed in a one-dimensional (1D) array or sequence. The 1D sequence may start from the bottom pixel in the column left to the prediction block, progress linearly through all reference pixels, and end at the last (i.e., most right) pixel in the row above the prediction block. FIG. 3 shows a schematic diagram of an embodiment of a sequence of reference pixels 300. For a N×N prediction block, the sequence 300 may comprise up to 4N+1 reference pixels with values P(0) to P(4N) from left to right. To filter a considered reference pixel which may be regarded as a current pixel 310 in the sequence 300, a number of neighboring pixels such as a left pixel 320 and a right pixel 330 may be used. The color values of the current, left, and right pixels may be denoted herein as P(n), P(n−1) and P(n+1) respectively, where n is an integer between (and including) 1 to 4N. In this case, the distance between the current pixel 310 and its neighboring pixels—namely the left pixel 320 and the right pixel 330 may be one. While FIG. 3 shows only one left pixel 320 and one right pixel 330 being used in filtering the current pixel 310, more neighboring pixels (or pixels in the neighborhood) may be used in bilateral filtering. Based on the number of neighboring pixels involved in filtering the current pixel 310, the distance between the current pixel 310 and its neighboring pixels may be greater than one. In use, a window size may refer to the number of neighboring pixels being considered in filtering the current pixel 310. The window size may be 2, as shown in FIG. 3, or greater.

As mentioned previously, a range filter and a domain filter may be combined into a bilateral filter. In an embodiment of the disclosure, the range filter may be a linear approximation of the original complex range filters. Coefficients of the range filter may be associated with photometric similarity of the current pixel and its neighboring pixels. On the other hand, the domain filter may also be a filter applied on top of the range filter. Coefficients of the domain filter may vary according to a pre-defined window size and the distances of neighboring pixels from the current pixel.

Consider, for the purpose of illustration, a 3-tap bilateral filter (with window size of 2) involving one left pixel and one right pixel in filtering the current pixel. In general, coefficients of the bilateral filter may be derived from coefficients of the range filter and the domain filter. Suppose that the range filter has coefficients [a, b, c], and the domain filter has coefficients [x, y, z], where a, b, c, x, y, z are natural numbers.

When the two filters are unified (or combined), final coefficients of the bilateral filter may be:

$$\left[\frac{ax}{ax+by+cz} \quad \frac{by}{ax+by+cz} \quad \frac{cz}{ax+by+cz}\right] \quad (1)$$

Now consider an implementation example of a bilateral filter. Herein, a difference between the current pixel and the left pixel may be denoted as:

$$DL=|P(n)-P(n-1)|$$

and the difference between the current pixel and the right pixel may be denoted as:

$$DR=|P(n)-P(n+1)|$$

In an embodiment of a 3-tap range filter, the coefficients may be configured to be:

$$\left[\frac{Max-k*DL}{3Max-k(DL+DR)} \quad \frac{Max}{3Max-k(DL+DR)} \quad \frac{Max-k*DR}{3Max-k(DL+DR)}\right] \quad (2)$$

where Max may refer to the maximum color value of a pixel, which may depend on a bit depth used to represent a pixel. For example, for an 8-bit color value, Max may be 255. In addition, k may be a constant determining the degree of filtering. In use, depending on the value of k, the range filter may be either a smoothing or a sharpening filter. Generally, a relatively low value of k (e.g., 1 or 2) may lead to a smoothing filter, whereas a relatively high value of k (e.g., 6) may lead to a sharpening filter.

The dividends (or numerators) in the coefficients of the range filter may be weights which depend on the color difference of neighboring pixels. Suppose, for example, that the reference pixels are located at a sharp edge of a video object in a video frame. Further, suppose that the value of the left pixel is much smaller than the current pixel, and the right pixel is similar to the current pixel. In this case, according to the Formula in (2), more weight may be given to the left pixel during filtering, so that the sharp edge feature may be preserved during intra smoothing. Suppose, for another example, that the reference pixels are in a smooth region of a video frame, and all left, current, and right pixels have the same color value. In this case, according to the Formula in (2), after normalization the range filter may simply be a [1 1 1] filter that has an equal weight for all pixels. In addition, it should be noted that the common divisor (or denominator) 3Max−k(DL+DR) may be configured in such a way that it does not equal zero.

In an embodiment of a 3-tap domain filter, the distance between the current pixel and its neighboring pixels (e.g., a left pixel and a right pixel) may simply equal one. Thus, a smoothing filter with linear coefficients [1 2 1] may be used. In fact, this smoothing filter may be the same or similar to some MDIS filters used in current designs of HEVC HM (e.g., HM 3.1). In this case, the range filter and the domain filter may be combined following the derivation outlined in Formula (1). After normalization, final coefficients of the bilateral filter may be:

$$\left[\frac{Max-k*DL}{4Max-k(DL+DR)} \quad \frac{2Max}{4Max-k(DL+DR)} \quad \frac{Max-k*DR}{4Max-k(DL+DR)}\right] \quad (3)$$

Accordingly, when the bilateral filter is applied to a current pixel, the filtered value of the current pixel may be:

$$F(n) = \frac{Max-k*DL}{4Max-k(DL+DR)}*P(n-1) + \quad (4)$$
$$\frac{2Max}{4Max-k(DL+DR)}*P(n) + \frac{Max-k*DR}{4Max-k(DL+DR)}*P(n+1)$$

Thus, once coefficients of the bilateral filter is computed, the filtered value is a linear combination of pixel values. In use, it should be noted that the common divisor 4Max−k(DL+DR) may be configured in such a way that it does not equal zero. As shown in Equation (4), the calculation of the filtered pixel value F(n) may involve a plurality of division, multiplication, addition, and/or subtraction operations. Since the maximum pixel value and the differences between pixels may be non-negative numbers, the calculation of F(n) may be simplified to one division operation as follows:

$$F(n) = \frac{(Max-k*DL)*P(n-1) + 2Max*P(n) + (Max-k*DR)*P(n+1)}{4Max-k(DL+DR)} \quad (5)$$

where the dividend (or numerator) and the divisor (or denominator) of F(n) may be separately presented as:

$$\text{Dividend}=(Max-k*DL)*P(n-1)+2Max*P(n)+ (Max-k*DR)*P(n+1) \quad (6)$$

$$\text{Divisor}=4Max-k(DL+DR) \quad (7)$$

As indicated by Equation (5), the calculation of F(n) may still involve a division operation, which may require higher complexity than operations such as bit shifting. Since all variables in F(n) may be integers, the division may be an integer division, which may be further simplified. In an embodiment, a rounding factor of $$2Max - \frac{k(DL+DR)}{2}$$

may be added to the dividend. The rounding factor may be half of the divisor in Equation (7). With the addition of the rounding factor, the dividend in Equation (6) may be changed to:

$$\text{Dividend} = (Max-k*DL)*P(n-1) + 2Max*P(n) + \quad (8)$$
$$(Max-k*DR)*P(n+1) + 2Max - \frac{k(DL+DR)}{2}$$

In a binary bit system, a multiplication or division operation by the power of 2 may be converted into a shifting operation (e.g., bitwise operation). For example, a multiplication by 2 may be realized by shifting the binary number one bit to the left (denoted as <<1), and a division by 2 may be realized by shifting the binary number one bit to the right (denoted as >>1). Accordingly, the dividend in Equation (8) and divisor in Equation (7) may be further simplified to be:

$$\text{Dividend}=(Max-k*DL)*P(n-1)+(Max*P(n))<<1+ (Max-k*DR)*P(n+1)+Max<<1-(k(DL+DR))>>1 \quad (9)$$

$$\text{Divisor}=Max<<2-k(DL+DR) \quad (10)$$

As mentioned previously, the constant k may determine the degree of filtering which may vary depending on application. In an embodiment, when k=1, the dividend in Equation (9) and divisor in Equation (10) may simply be:

$$\text{Dividend} = (\text{Max}-DL)*P(n-1)+(\text{Max}*P(n))<<1+ (\text{Max}-DR)*P(n+1)+\text{Max}<<1-(DL+DR)>>1 \quad (11)$$

$$\text{Divisor} = \text{Max}<<2-(DL+DR) \quad (12)$$

Similarly, in an embodiment, when k=2, the dividend in Equation (9) and divisor in Equation (10) may simply be:

$$\text{Dividend} = (\text{Max}-(DL<<1))*P(n-1)+(\text{Max}*P(n)) <<1+(\text{Max}-(DR<<1))*P(n+1)+\text{Max}<<1- (DL+DR) \quad (13)$$

$$\text{Divisor} = \text{Max}<<2-(DL+DR)<<1 \quad (14)$$

Moreover, the integer division of the dividend and the divisor above may also be simplified into shifting, addition and/or subtraction operations. An embodiment of an algorithm for simplification of the integer division is presented in pseudo code in Table 1.

TABLE 1 an algorithm for simplification of integer division.

```
Unsigned Int uiNewDividend = abs(Dividend), uiNewDivisor =
abs(Divisor);
if (Dividend and Divisor both positive/negative)
  { bSignQuotient = 1;}
else
  { bSignQuotient = 0;}
while (uiNewDividend > uiNewDivisor)
{
  for (k=0, c=uiNewDivisor; uiNewDividend>=c; c<<=1, k++)
  {
    if(uiNewDividend-c < uiNewDivisor)
    {
      iQuotient += 1<<k;
      break;
    }
  }
  if(uiNewDividend-c < uiNewDivisor)
    break;
  iQuotient += 1<<(k-1);
  uiNewDividend -= c>>1;
}
Int iFilteredPixVal = bSignQuotient ? (Int)iQuotient : -(Int)iQuotient;
```

As shown in Table 1, the algorithm may be implemented using a programming software, such as C or C++ language. In an embodiment, inputs of the algorithm may be a dividend (e.g., computed as in Equation 6) and a divisor (e.g., computed as in Equation 7), and an output of the algorithm may be a filtered value of the current pixel. To eliminate division operation, the quotient may be generated by iterative comparison of the dividend and the divisor. For example, in one iteration, if the dividend is larger than the divisor, the quotient (initially set to zero) may increment by one, and the dividend may be subtracted by the divisor. In the next iteration, the reduced dividend may be compared again with the divisor, and if the dividend is larger than the divisor, the quotient may again increment by one. Iteration may continue until the iteratively reduced dividend is smaller than the divisor. Then, the incremented quotient may be taken as the filtered value of the current pixel. The reminder of the division may be ignored regardless of its value.

Using a suitable algorithm (e.g., algorithm in Table 1), the computation of the filtered value of the current pixel (i.e., F(n)) may only include integer operations such as shifting, multiplication, addition and/or subtraction, which may have relatively low complexity. In an embodiment, F(n) may be determined based on an algorithm that may be implemented using hardware, software, firmware, or combinations thereof. For example, the algorithm may be implemented in a codec.

Figure 4:
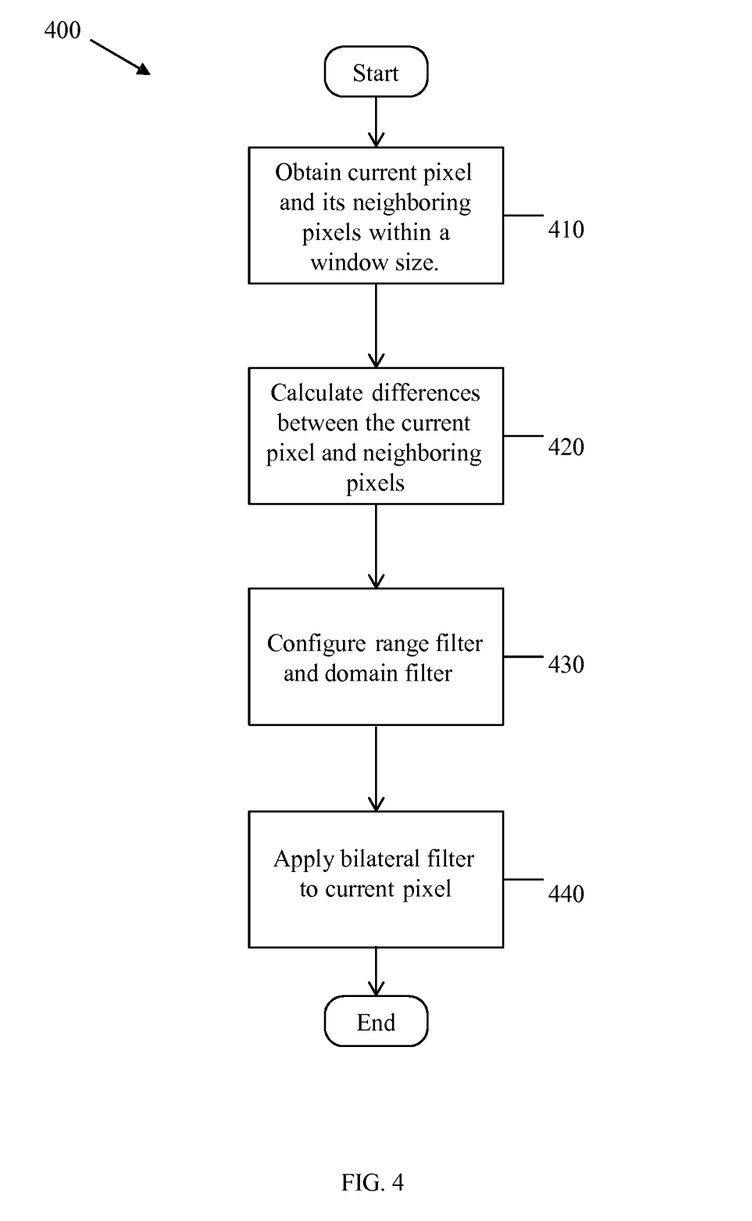
FIG. 4 is a flowchart of an embodiment of a simplified bilateral filtering method.

FIG. 4 shows a flowchart of an embodiment of a simplified bilateral filtering method 400, which may be used to filter reference pixels of a prediction block. The method 400 may filter a current pixel based on its photometric similarity with neighboring pixels as well as its spatial distance from neighboring pixels. The method 400 may start in step 410, where color values of the current pixel and its neighboring pixels within a pre-defined window size may be obtained. For example, for a 3-tap bilateral filter with a window size of 2, the values of the current pixel, one left pixel, and one right pixel may be obtained. With a larger window size, more pixel values may need to be obtained. Next, in step 420, color differences between the current pixel and its neighboring pixels may be calculated. In an embodiment of a 3-tap bilateral filter, the difference between the current pixel and one left pixel (i.e., DL), as well as the difference between the current pixel and one right pixel (i.e., DR), may be calculated. With a larger window size, differences between the current pixel and more neighboring pixels may need to be calculated. The differences may vary between zero and a maximum value, which may depend on a bit depth used to represent pixel colors.

Next, in step 430, a range filter and a domain filter (or distance filter) may be configured, the two of which comprise a bilateral filter. The range filter may be based on the calculated differences between the current pixel and its neighboring pixels. In an embodiment of a 3-tap range filter, the range filter coefficients may be those in Formula (2). In addition, the domain filter may be based on spatial distances between the current pixel and its neighboring pixels. In an embodiment of a 3-tap domain filter, the domain filter coefficients may be [1 2 1]. In this case, both the distance between the current pixel and the left pixel, and the distance between the current pixel and the right pixel may simply equal one. It should be noted that, with a larger window size, distances between the current pixel and its neighboring pixels may be greater than one. The averaging weight of a neighboring pixel in the domain filter may decrease as its distance from the current pixel increases. After configuration of the range filter coefficients and domain filter coefficients, both photometric similarity and spatial closeness of reference pixels may be accounted for in the disclosed bilateral filter. The range filter coefficients and domain filter coefficients may be combined to form bilateral filter coefficients. In an embodiment, the bilateral filter coefficients may be as shown in Formula (3).

Next, in step 440, the bilateral filter may be applied on the current pixel to adjust its color. In use, the bilateral filter may be applied as two separate filters, wherein the domain filter may be applied after the range filter. Alternatively, the bilateral filter may be applied as a unified (or combined) filter. Based on the bilateral filter coefficients, a desired filtered value of the current pixel (i.e., F(n)) may be generated, for example, as shown in Equation (5) with a dividend and a divisor. Since all variables in the calculation of F(n) may be integers, the division may be converted to operations of integer shifting, addition and/or subtraction, which may have relatively low computational complexity. Eventually, F(n) may have, for example, a dividend as shown in Equation (9) and a divisor as shown in Equation (10). With given values of k, the calculation of F(n) may be further simplified. In practice, F(n) may be computed using any of a variety of algorithms. For example, the algorithm shown in Table 1 may be applied to compute F(n). After color adjustment to the desired filtered value, the current pixel may be used for intra smoothing of other reference pixels and/or generation of prediction pixels in the prediction block.

In use, an embodiment of a disclosed simplified bilateral filter may be tested and compared with current MDIS filters used in HEVC HM anchors. To evaluate the performance of the simplified bilateral filter, simulations using a disclosed intra smoothing scheme were applied for entropy encoding, where both Intra High Efficiency (HE) and Intra Low Complexity (LC) configurations were tested. Testing results included the average percentage RD costs on a plurality of resolution classes (Classes A, B, C, D, and E) for the three components of color space (Y, U, and V), as well as encryption (Enc) and decryption (Dec) times. In the simulations, the RD costs of intra prediction using the disclosed intra smoothing scheme was compared with intra prediction used in a HM 3.1 anchor under three different scenarios, the testing results of which are shown in Tables 2-4 respectively.

Table 2 shows the testing results of intra prediction using a disclosed bilateral filter in comparison to the HM 3.1 anchor, when the MDIS filters in the HM 3.1 anchor were turned off. Thus, intra smoothing using bilateral filtering was performed on reference pixels in the test case, but no intra smoothing was performed on reference pixels in the HM 3.1 anchor (or control case). Results suggested that the average RD costs of the test case decreased for all YUV components. For example, the average RD cost of all resolution classes decreased by about 0.21% for the Y-luma component in All Intra HE. The decrease in RD cost indicated the requirement for a lower bitrate with the same amount of video distortion, which signaled an improved quality of video coding. However, in comparison to the HM 3.1 anchor with MDIS turned off, the Enc and Dec times of the test case increased by a small amount for both All Intra HE (about 3%) and All Intra LC (about 3% to 5%).

Table 3 shows the testing results of intra prediction using a disclosed bilateral filter in comparison to the HM 3.1 anchor, when the MDIS filters in the HM 3.1 anchor were turned on. Thus, intra smoothing was performed both in the test case and the HM 3.1 anchor (or control case). Results suggested that the average RD costs of the test case decreased slightly for all YUV components. For example, the average RD cost of all resolution classes decreased by about 0.06% for the Y-luma component in All Intra HE. The slight decrease in RD cost indicated the requirement for a slightly lower bitrate with the same amount of video distortion, which signaled an improved quality of video coding. However, in comparison to the HM 3.1 anchor with MDIS turned on, the Enc and Dec times of the test case increased by a small amount for both All Intra HE (about 2%) and All Intra LC (about 1% to 2%).

As mentioned previously, one of the advantages of the disclosed intra smoothing scheme may be the preservation of strong edges or lines in a video frame. Thus, to evaluate the performance of the disclosed intra smoothing scheme on video sequences with strong edges or lines, a "BasketballDrill" sequence, which is a standard test sequence of the C class, was used to compare the disclosed intra smoothing scheme with the HM 3.1 anchor (with MDIS turned on). As shown in Table 4, the testing results suggested that the average RD costs of the test case decreased significantly for all YUV components. For example, the average RD cost of all resolution classes decreased by about 0.4% for the Y-luma component in All Intra HE, and by about 0.6% for the Y-luma component in All Intra LC. The decrease in RD cost indicated the requirement for a lower bitrate with the same amount of video distortion, which signaled an improved quality of video coding.

It should be noted that the testing results of the "BasketballDrill" sequence (Class C) shown in Table 4 may be different from the C class results shown in Table 3. The difference may be accounted by the fact that the Class C videos tested in Table 3 contained four different video sequences including the "BasketballDrill" sequence and three other sequences. Consequently, the RD performance shown in Table 3 was an average of the four video sequences. Actually, the difference in RD performances of C class videos in Table 3 and Table 4 may offer confirmation that the disclosed bilateral intra smoothing filter may work particularly well on video sequences containing strong edges or lines.

TABLE 2

RD performance of a disclosed intra smoothing scheme compared with an HM 3.1 anchor with MDIS turned off.

| | All Intra HE | | | All Intra LC | | |
|---|---|---|---|---|---|---|
| | Y | U | V | Y | U | V |
| Class A | −0.35 | −0.39 | −0.48 | −0.50 | −0.40 | −0.61 |
| Class B | −0.23 | −0.28 | −0.35 | −0.31 | −0.23 | −0.25 |
| Class C | −0.01 | −0.10 | −0.04 | 0.20 | −0.01 | 0.01 |
| Class D | −0.16 | −0.25 | −0.22 | −0.17 | −0.16 | −0.23 |
| Class E | −0.34 | −0.54 | −0.53 | −0.52 | −0.49 | −0.46 |
| Overall | −0.21 | −0.30 | −0.32 | −0.25 | −0.24 | −0.30 |
| Enc Time[%] | | 103% | | | 105% | |
| Dec Time[%] | | 103% | | | 103% | |

TABLE 3

RD performance of a disclosed intra smoothing scheme compared with an HM 3.1 anchor with MDIS turned on.

| | All Intra HE | | | All Intra LC | | |
|---|---|---|---|---|---|---|
| | Y | U | V | Y | U | V |
| Class A | 0.04 | 0.05 | 0.14 | 0.14 | 0.03 | 0.09 |
| Class B | −0.04 | −0.07 | −0.15 | 0.02 | −0.03 | −0.08 |
| Class C | −0.14 | −0.15 | −0.10 | −0.15 | −0.17 | −0.16 |
| Class D | −0.12 | −0.12 | −0.07 | −0.07 | −0.05 | −0.12 |
| Class E | −0.03 | −0.01 | −0.01 | 0.07 | −0.01 | −0.01 |
| Overall | −0.06 | −0.06 | −0.04 | 0.00 | −0.05 | −0.06 |
| Enc Time[%] | | 102% | | | 102% | |
| Dec Time[%] | | 102% | | | 101% | |

TABLE 4

RD performance of a disclosed intra smoothing scheme on the "BasketballDrill" sequence compared with an HM 3.1 anchor with MDIS turned on.

| | All Intra HE | | | All Intra LC | | |
|---|---|---|---|---|---|---|
| Class C | Y | U | V | Y | U | V |
| BasketballDrill | −0.4 | −0.5 | −0.4 | −0.6 | −0.6 | −0.5 |

The simulation results in Tables 2-4 may indicate that the RD costs of an embodiment of the disclosed bilateral filter may decrease in comparison to the HM 3.1 anchor. The RD cost may decrease more significantly on video sequences containing strong edges or lines, such as the "BasketballDrill" sequence. For more details regarding the simulation tests above, please refer to a report entitled "Simplified Bilateral Intra Smoothing Filter," by Guichun Li, Lingzhi Liu, Nam Ling, Jianhua Zheng, and Philipp Zhang in the *6th Meeting of the Joint Collaborative Team on Video Coding (JCT-VC) of ITU-T SG16 WP3 il and ISO/IEC JTC1/SC29/WG11*, Torino, IT, 14-22 Jul., 2011, Doc. JCTVC-F528, which is hereby incorporated by reference. Overall, the simplified bilateral filtering may bring about coding gain. Further, the preservation of edges or lines by the disclosed bilateral filtering may help reduce information loss, and thereby improve subjective quality of decoded videos.

Figure 5:
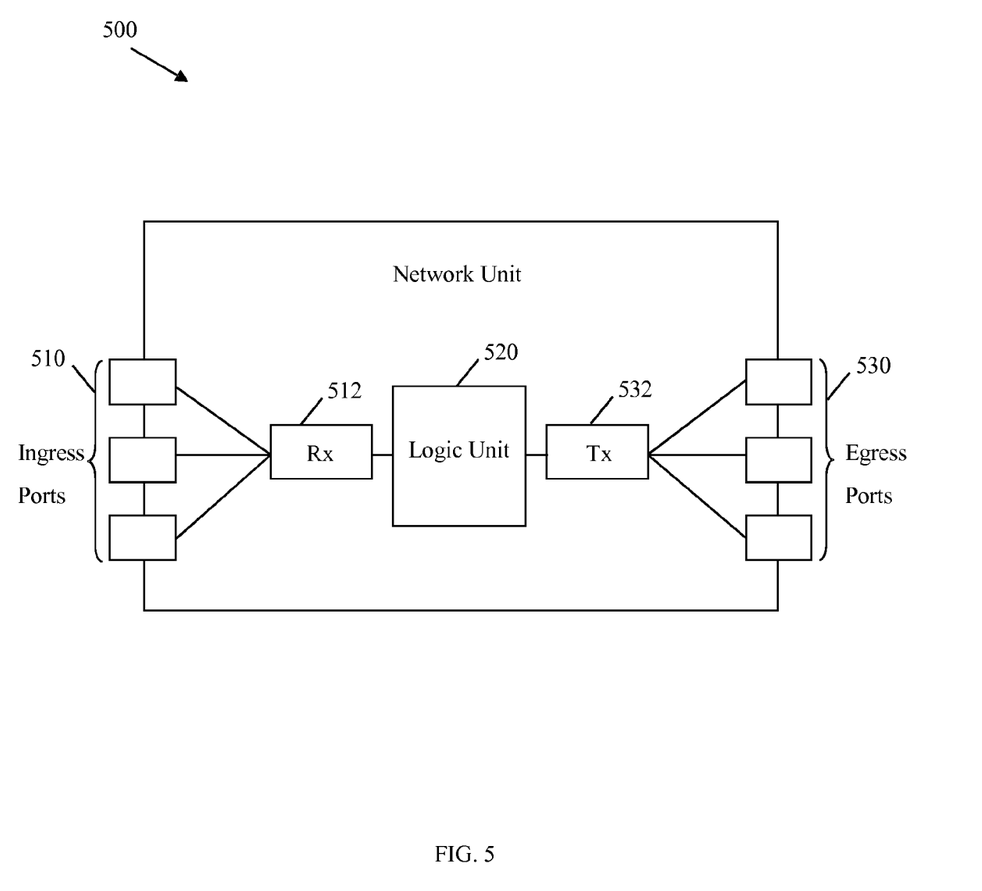
FIG. 5 is a schematic diagram of an embodiment of a network unit.

FIG. 5 illustrates an embodiment of a network unit 500, which may comprise a processor or a video/image codec that processes images and predicts blocks as described above, e.g., within a network or system. For instance, the network unit 500 may correspond to a media controller at an image transmitter and/or receiver. The network unit 500 may comprise a plurality of ingress ports 510 and/or receiver units 512 for receiving data from other codecs, logic unit or processor 520 to process images and determine which codecs to send the data to, and a plurality of egress ports 530 and/or transmitter units 532 for transmitting data to the other codecs. The logic unit or processor 520 may be configured to implement any of the schemes described herein, such as the simplified bilateral filtering method 400, and may be implemented using hardware, software, or both.

Figure 6:
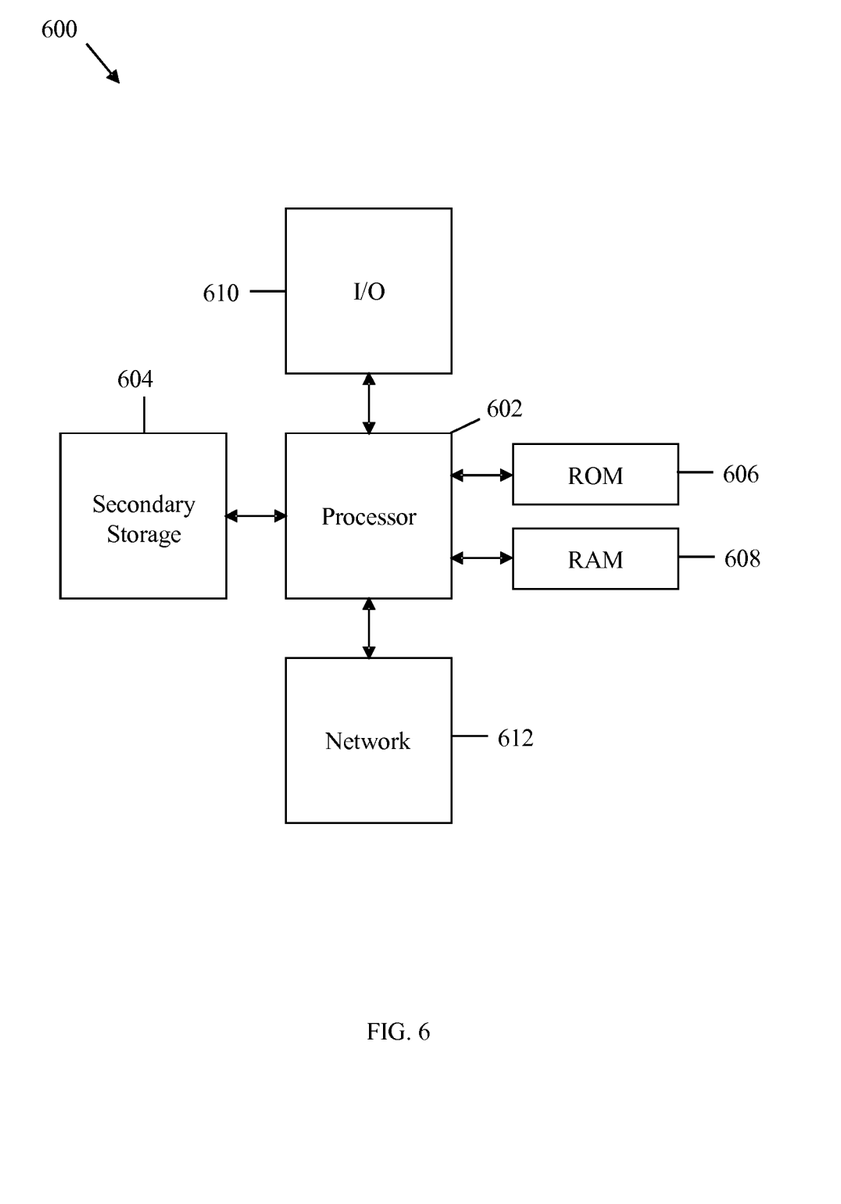
FIG. 6 is a schematic diagram of an embodiment of a general-purpose computer system.

The schemes described above may be implemented on any general-purpose network component, such as a computer or network component with sufficient processing power, memory resources, and network throughput capability to handle the necessary workload placed upon it. FIG. 6 illustrates a typical, general-purpose network component or computer system 600 suitable for implementing one or more embodiments of the methods disclosed herein, such as the simplified bilateral filtering method 400. The general-purpose network component or computer system 600 includes a processor 602 (which may be referred to as a central processor unit or CPU) that is in communication with memory devices including secondary storage 604, read only memory (ROM) 606, random access memory (RAM) 608, input/output (I/O) devices 610, and network connectivity devices 612. Although illustrated as a single processor, the processor 602 is not so limited and may comprise multiple processors. The processor 602 may be implemented as one or more CPU chips, cores (e.g., a multi-core processor), field-programmable gate arrays (FPGAs), application specific integrated circuits (ASICs), and/or digital signal processors (DSPs), and/or may be part of one or more ASICs. A sequence of reference pixels, such as those illustrated in FIG. 3, may be loaded into a memory, such as the RAM 606. The processor 602 may be configured to implement any of the schemes described herein, including the simplified bilateral filtering method 400, which may be implemented using hardware, software, or both.

The secondary storage 604 is typically comprised of one or more disk drives or tape drives and is used for non-volatile storage of data and as an over-flow data storage device if RAM 608 is not large enough to hold all working data. Secondary storage 604 may be used to store programs that are loaded into RAM 608 when such programs are selected for execution. The ROM 606 is used to store instructions and perhaps data that are read during program execution. ROM 606 is a non-volatile memory device that typically has a small memory capacity relative to the larger memory capacity of secondary storage 604. The RAM 608 is used to store volatile data and perhaps to store instructions. Access to both ROM 606 and RAM 608 is typically faster than to secondary storage 604.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 7 percent, . . . , 70 percent, 71 percent, 72 percent, . . . , 97 percent, 96 percent, 97 percent, 98 percent, 99 percent, or 100 percent. Moreover, any numerical range defined by two R numbers as defined in the above is also specifically disclosed. The use of the term about means±10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. A method comprising:
   receiving a plurality of reference pixels;
   computing a plurality of filter coefficients based on differences between a reference pixel and neighboring reference pixels in the plurality of reference pixels and based on distances between the reference pixel and the neighboring reference pixels; and combining the filter coefficients with the reference pixel and the neighboring reference pixels to generate a filtered value, wherein the filtered value is a linear combination of the reference pixel and the neighboring reference pixels and used for intra prediction, wherein the plurality of filter coefficients comprise three filter coefficients, wherein a first distance between the reference pixel and a left pixel is equal to one, wherein a second distance between the reference pixel and a right pixel is equal to one, and wherein at least one filter coefficient is based on a maximum value for the plurality of reference pixels, a degree of filtering, a first difference between the reference pixel value and the left pixel value, a second difference between the reference pixel value and the right pixel value, or any combination thereof, and wherein the filter coefficients are:

$$\left[\frac{Max - k*DL}{4Max - k(DL+DR)} \quad \frac{2Max}{4Max - k(DL+DR)} \quad \frac{Max - k*DR}{4Max - k(DL+DR)}\right],$$

where Max represents the maximum value for the plurality of reference pixels up to 255, k is the degree of filtering between 1 and 6, DL is the first difference, and DR is the second difference.

2. The method of claim 1, where k=2.

3. The method of claim 1, wherein the filtered value is computed using a single integer division.

4. The method of claim 1, further comprising:
computing a second plurality of filter coefficients based on differences between a second reference pixel and second neighboring reference pixels in the plurality of reference pixels; and
combining the second plurality of filter coefficients with the second reference pixel and the second neighboring reference pixels to generate a second filtered value, wherein the second filtered value is used for intra prediction.

5. An apparatus comprising:
a processor configured to:
receive a plurality of reference pixels;
compute a plurality of filter coefficients based on differences between a reference pixel and neighboring reference pixels in the plurality of reference pixels and based on distances between the reference pixel and the plurality of neighboring reference pixels; and
combine the filter coefficients with the reference pixel and the neighboring reference pixels to generate a filtered value, wherein the filtered value is a linear combination of the reference pixel and the neighboring reference pixels and used for intra prediction,
wherein the plurality of filter coefficients comprise three filter coefficients, wherein a first distance between the reference pixel and a left pixel is equal to one, wherein a second distance between the reference pixel and a right pixel is equal to one, and wherein at least one filter coefficient is based on a maximum value for the plurality of reference pixels, a degree of filtering, a first difference between the reference pixel value and the left pixel value, a second difference between the reference pixel value and the right pixel value, or any combination thereof, and
wherein the filter coefficients are:

$$\left[\frac{Max - k*DL}{4Max - k(DL+DR)} \quad \frac{2Max}{4Max - k(DL+DR)} \quad \frac{Max - k*DR}{4Max - k(DL+DR)}\right],$$

where Max represents the maximum value for the plurality of reference pixels up to 255, k is the degree of filtering between 1 and 6, DL is the first difference, and DR is the second difference.

6. The apparatus of claim 5, wherein k=2.

7. The apparatus of claim 5, wherein the filtered value is computed using a single integer division.

8. The apparatus of claim 5, wherein the processor is further configured to:
compute a second plurality of filter coefficients based on differences between a second reference pixel and second neighboring reference pixels in the plurality of reference pixels; and
combine the second plurality of filter coefficients with the second reference pixel and the second neighboring reference pixels to generate a second filtered value, wherein the second filtered value is used for intra prediction.

9. An apparatus comprising:
at least one processor configured to:
receive a plurality of reference pixels, wherein the reference pixels comprise a current pixel and a plurality of neighboring pixels;
compute a plurality of bilateral filter coefficients based on:
a range filter comprising a plurality of range filter coefficients, wherein at least one range filter coefficient is based on a difference between the current pixel and at least one neighboring pixel, and
a domain filter comprising a plurality of domain filter coefficients, wherein at least one domain filter coefficient is based on a distance between the current pixel and at least one neighboring pixel; and
combine the bilateral filter coefficients with the current pixel and the neighboring pixels to generate a filtered value, wherein the filtered value is a linear combination of the current pixel and the plurality of neighboring pixels and used for intra prediction,
wherein the range filter is a 3-tap filter comprising three range filter coefficients, wherein at least one range filter coefficient is based on a maximum value for the plurality of reference pixels, a degree of filtering, a first difference between the current pixel value and a left pixel value, a second difference between the current pixel value and a right pixel value, or any combination thereof, and
wherein the range filter coefficients are:

$$\left[\frac{Max - k*DL}{3Max - k(DL+DR)} \quad \frac{Max}{3Max - k(DL+DR)} \quad \frac{Max - k*DR}{3Max - k(DL+DR)}\right],$$

where Max is the maximum value for the plurality of reference pixels up to 255, k is the degree of filtering between 1 and 6, DL is a positive integer representing the first difference, and DR is a positive integer representing the second difference.

10. The apparatus of claim 9, wherein the domain filter is a 3-tap filter comprising three domain filter coefficients, wherein a first distance between the current pixel and the left pixel is equal to one, and wherein a second distance between the current pixel and the right pixel is equal to one.

11. The apparatus of claim 9, wherein k=2.

* * * * *